United States Patent
Maes

(10) Patent No.: US 8,990,413 B2
(45) Date of Patent: Mar. 24, 2015

(54) SERVICE LEVEL CROSS NETWORK COORDINATED INTERACTION

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 212 days.

(21) Appl. No.: 13/021,982

(22) Filed: Feb. 7, 2011

(65) Prior Publication Data
US 2011/0196974 A1    Aug. 11, 2011

Related U.S. Application Data

(60) Provisional application No. 61/301,822, filed on Feb. 5, 2010.

(51) Int. Cl.
*G06F 15/16* (2006.01)
*H04L 29/06* (2006.01)

(52) U.S. Cl.
CPC .............. *H04L 65/104* (2013.01); *H04L 69/08* (2013.01); *H04L 65/1006* (2013.01); *H04L 65/80* (2013.01)
USPC ....................................................... 709/228

(58) Field of Classification Search
CPC ....... H04L 65/1016; G06F 15/16; H04M 3/42
USPC ........... 370/352; 379/201.12, 202.01; 709/21, 709/93, 218, 224, 231, 328
See application file for complete search history.

(56) References Cited

U.S. PATENT DOCUMENTS

| | | | |
|---|---|---|---|
| 7,620,384 B2 | 11/2009 | Cai et al. | |
| 7,983,254 B2 | 7/2011 | Alt et al. | |
| 8,060,604 B1 | 11/2011 | Breau et al. | |
| 8,126,722 B2 | 2/2012 | Robb et al. | |
| 8,218,457 B2 | 7/2012 | Malhotra et al. | |
| 8,396,055 B2 | 3/2013 | Patel et al. | |
| 8,626,951 B2 | 1/2014 | Casey et al. | |
| 8,705,518 B1 | 4/2014 | Afshar et al. | |
| 2001/0046234 A1 | 11/2001 | Agrawal et al. | |

(Continued)

OTHER PUBLICATIONS

U.S. Appl. No. 13/021,974, filed Feb. 7, 2011, Non-final Office Action mailed Nov. 28, 2012, 18 pages.

(Continued)

*Primary Examiner* — Helal A Algahaim
*Assistant Examiner* — Mahmoud Ismail
(74) *Attorney, Agent, or Firm* — Kilpatrick Townsend & Stockton LLP

(57) ABSTRACT

Embodiments of the invention provide systems and methods for orchestrating or coordinating interactions between different types of networks such as a legacy network and a next generation network. According to one embodiment, a method for coordinating interactions between different types of networks can comprise receiving at a service layer component a communication in a communication session from a first communication network. The communication can be in a first protocol. The communication can be translated from the first protocol to a second protocol with the service layer component, wherein the first protocol is different from the second protocol. One or more additional service layer components for providing at least one service in the communication session can be identified with an application dispatcher of the service layer component. The translated communication can be dispatched to the one or more additional service layer components from the application dispatcher.

19 Claims, 4 Drawing Sheets

(56) References Cited

U.S. PATENT DOCUMENTS

| | | |
|---|---|---|
| 2003/0091026 A1* | 5/2003 | Penfield et al. ............... 370/352 |
| 2004/0205209 A1 | 10/2004 | Wengrovitz et al. |
| 2006/0007954 A1 | 1/2006 | Agrawal et al. |
| 2006/0209791 A1 | 9/2006 | Khadri et al. |
| 2006/0253860 A1 | 11/2006 | Hoerle et al. |
| 2006/0274730 A1 | 12/2006 | Medlock et al. |
| 2007/0116223 A1* | 5/2007 | Burke et al. ............. 379/201.12 |
| 2007/0150480 A1 | 6/2007 | Hwang et al. |
| 2007/0297339 A1 | 12/2007 | Taylor et al. |
| 2008/0056243 A1 | 3/2008 | Roy et al. |
| 2008/0137646 A1 | 6/2008 | Agarwal et al. |
| 2008/0232567 A1* | 9/2008 | Maes ...................... 379/201.12 |
| 2008/0263187 A1 | 10/2008 | Casey et al. |
| 2009/0150945 A1 | 6/2009 | Park et al. |
| 2009/0265434 A1 | 10/2009 | Benc et al. |
| 2009/0323632 A1 | 12/2009 | Nix |
| 2010/0124217 A1 | 5/2010 | Suzuki |
| 2010/0167762 A1 | 7/2010 | Pandey et al. |
| 2010/0217837 A1* | 8/2010 | Ansari et al. ................. 709/218 |
| 2010/0220845 A1* | 9/2010 | Oliver et al. ............. 379/202.01 |
| 2010/0274914 A1 | 10/2010 | Birch et al. |
| 2010/0281488 A1 | 11/2010 | Krishnamurthy et al. |
| 2011/0107379 A1 | 5/2011 | Lajoie et al. |
| 2011/0196979 A1 | 8/2011 | Maes |
| 2011/0196980 A1 | 8/2011 | Maes |
| 2011/0212773 A1 | 9/2011 | Hjelm et al. |
| 2011/0274116 A1 | 11/2011 | Ozawa |

OTHER PUBLICATIONS

U.S. Appl. No. 13/021,991, filed Feb. 7, 2011, Non-final Office Action mailed Nov. 13, 2012, 12 pages.

U.S. Appl. No. 13/021,991, Non-Final Office Action mailed on Feb. 27, 2014, 10 pages.

U.S. Appl. No. 13/021,991, filed Feb. 7, 2011, Final Office Action mailed Jun. 21, 2013, 11 pages.

U.S. Appl. No. 13/021,974, filed Feb. 7, 2011, Final Office Action mailed Jun. 20, 2013, 21 pages.

U.S. Appl. No. 13/021,991, filed Feb. 7, 2011, Advisory Action mailed Aug. 30, 2013, 3 pages.

U.S. Appl. No. 13/021,974, filed Feb. 7, 2011, Advisory Action mailed Aug. 28, 2013, 3 pages.

U.S. Appl. No. 13/021,974, Notice of Allowance mailed on Jul. 23, 2014, 10 pages.

U.S. Appl. No. 13/021,991, Final Office Action mailed on Sep. 9, 2014, 8 pages.

* cited by examiner

SERVICE LEVEL CROSS NETWORK COORDINATED INTERACTION

CROSS-REFERENCES TO RELATED APPLICATIONS

The present application claims benefit under 35 USC 119 (e) of U.S. Provisional Application No. 61/301,822, filed on Feb. 5, 2010 by Maes and entitled "Service Level Cross Network Coordinated Interaction," of which the entire disclosure is incorporated herein by reference for all purposes.

BACKGROUND OF THE INVENTION

Embodiments of the present invention relate generally to methods and systems for supporting interactions in communication sessions and more particularly to orchestrating or coordinating interactions between different types of networks.

New networks, i.e., "next generation networks," such as Internet Protocol (IP) Multimedia Subsystem (IMS) networks and various IP-based networks such as the Internet have been and are being developed to support communication sessions and services related thereto. Various approaches have been developed to integrate these networks and services with various types of "legacy" networks such as a Public Switch Telephone Network (PSTN) and various other types of fixed and mobile communication networks. However, these efforts have been limited to allowing the new services to operate on or interact with the legacy networks. No approach has been developed to allow existing, legacy applications, i.e., applications written for a legacy network, to operate on or interact with the new, next generation networks or to coordinate or orchestrate such interactions. However, these legacy applications may still be useful and valuable. Furthermore, replacing or modifying these legacy applications to operate on or interact with next generation networks can be costly and time consuming. Such considerations can limit or slow the move to adopt next generation networks. Hence, there is a need for improved methods and systems for allowing legacy applications to interact with new networks and protocols or components thereof.

BRIEF SUMMARY OF THE INVENTION

Embodiments of the invention provide systems and methods for orchestrating or coordinating interactions between different types of networks such as a legacy network and a next generation network. According to one embodiment, a method for coordinating interactions between different types of networks can comprise receiving at a service layer component a communication in a communication session from a first communication network. The communication can be in a first protocol. The communication can be translated from the first protocol to a second protocol with the service layer component, wherein the first protocol is different from the second protocol. One or more additional service layer components for providing at least one service in the communication session can be identified with an application dispatcher of the service layer component. The translated communication can be dispatched to the one or more additional service layer components from the application dispatcher.

For example, the first communication network can comprise a legacy network and the second communication network can comprise a next generation network. The service layer component can comprise a Service Delivery Platform (SDP) and the translated communication can be provided to a component of the next generation network. In such cases, providing the second communication to the component of the next generation network can comprise providing the second communication to a northbound interface of an enabler of the SDP. Additionally or alternatively, providing the second communication to the component of the next generation network can further comprise providing the second communication to a Session Initiation Protocol (SIP) servlet of the SDP and the second protocol comprises SIP. The one or more additional service layer components can comprise one or more enablers. For example, the one or more enablers can comprise one or more of a call control enabler, a media server control enabler, a messaging enabler, a charging enabler, a voice access enabler, and a presence enabler.

In another example, the first communication network can comprise a next generation network and the second communication network can comprise a legacy network. The service layer component can comprise a Service Delivery Platform (SDP) and the second communication can be provided to a component of the legacy network. In such cases, providing the second communication to the component of the legacy network can comprise providing the second communication to a northbound interface of an enabler of the SDP. The one or more additional service layer components can comprise one or more enablers. For example, the one or more enablers can comprise one or more of a call control enabler, a media server control enabler, a messaging enabler, a charging enabler, a voice access enabler, and a presence enabler. Additionally or alternatively, providing the second communication to the component of the legacy can further comprise providing the second communication to a Internet Protocol (IP) Multimedia Service Switching Function (IM-SSF) of the SDP.

According to another embodiment, a system can comprise a legacy network, a next generation network, and a service delivery platform (SDP) communicatively coupled with the legacy network and the next generation network. The service delivery platform can be adapted to translate communications between a protocol of the legacy network and a protocol of the next generation network. The SDP can further comprise an application dispatcher adapted to identify one or more additional service layer components for providing at least one service in the communication session and dispatch the translated communication to the one or more additional service layer components. The SDP can further comprise one or more enablers communicatively coupled with the next generation network and adapted to provide a northbound interface abstracting the underlying network technologies of the next generation network. Additionally or alternatively, the SDP can further comprise a Session Initiation Protocol (SIP) servlet and translating communications between the protocol of the legacy network and the protocol of the next generation network can comprise translating communications between the protocol of the legacy network and the protocol of the next generation network to SIP. The one or more additional service layer components can comprise one or more enablers and the one or more enablers can comprise one or more of a call control enabler, a media server control enabler, a messaging enabler, a charging enabler, a voice access enabler, and a presence enabler.

According to yet another embodiment, a machine-readable medium can have stored thereon a series of instruction which, when executed by a processor, cause the processor to coordinate interactions between different types of networks by receiving at a service layer component a communication in a communication session from a first communication network. The communication is in a first protocol. The communication can be translated from the first protocol to a second protocol with the service layer component, wherein the first protocol is different from the second protocol. One or more additional service layer components for providing at least one service in the communication session can be identified with an application dispatcher of the service layer component. The translated communication can be dispatched to the one or more additional service layer components from the application dispatcher.

DETAILED DESCRIPTION OF THE INVENTION

Figure 1:
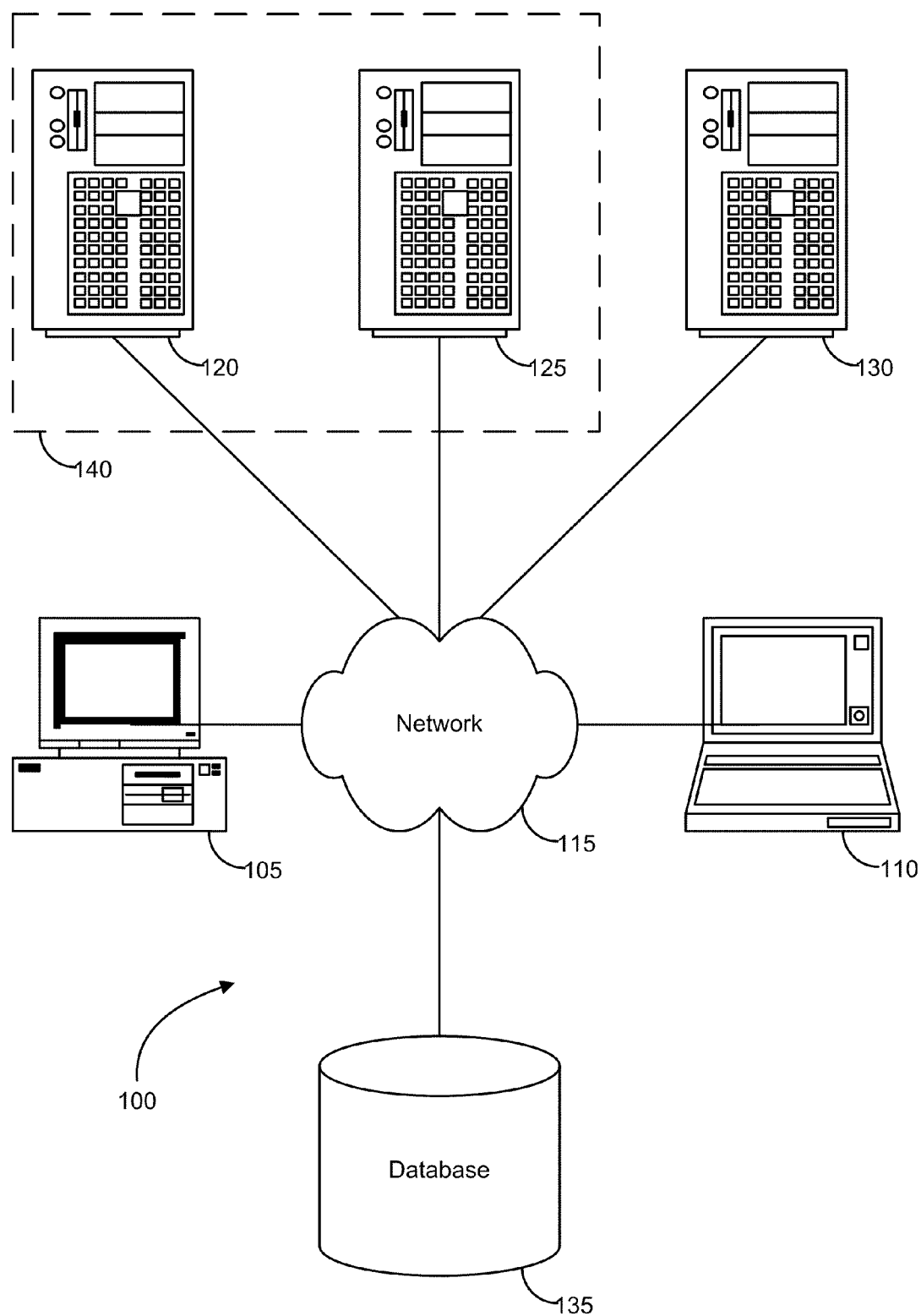
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide methods and systems for orchestrating or coordinating interactions between different types of networks such as a legacy network and a next generation network. Generally speaking, orchestrating or coordinating interactions between different types of networks can be performed by using a service level component such as s Service Delivery Platform (SDP) as will be described in greater detail below to perform mapping and translation between the protocols of the legacy network and the next generation network. Additionally, and as will also be described in greater detail below, the SDP can be implemented in a manner to allow the SDP to abstract the underlying network technologies of the next generation network so as to allow the legacy applications to interact with or participate in communications with services, components, clients, etc, of the next generation network without needing to be aware of the protocols and other technologies thereof. Furthermore, the SDP can include an application dispatcher as will be described in greater detail below. The application dispatcher can identify additional components of the SDP, such as one or more enablers, for providing services in the communication session and can dispatch the translated communication to the identified components.

More specifically coordinating interactions between different types of networks can comprise receiving at a service layer component a communication in a communication session from a first communication network. The communication can be in a first protocol, i.e., the legacy network or the next generation network depending on the source or originator of the communication. The communication can be translated from the first protocol to a second protocol with the service layer component based on a state of the communication session. For example, the service layer component can comprise a SDP as described herein. According to one embodiment, the SDP can include an application dispatcher. The application dispatcher can identify one or more additional service layer components for providing at least one service in the communication session and can dispatch the translated communication to the one or more additional service layer components. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
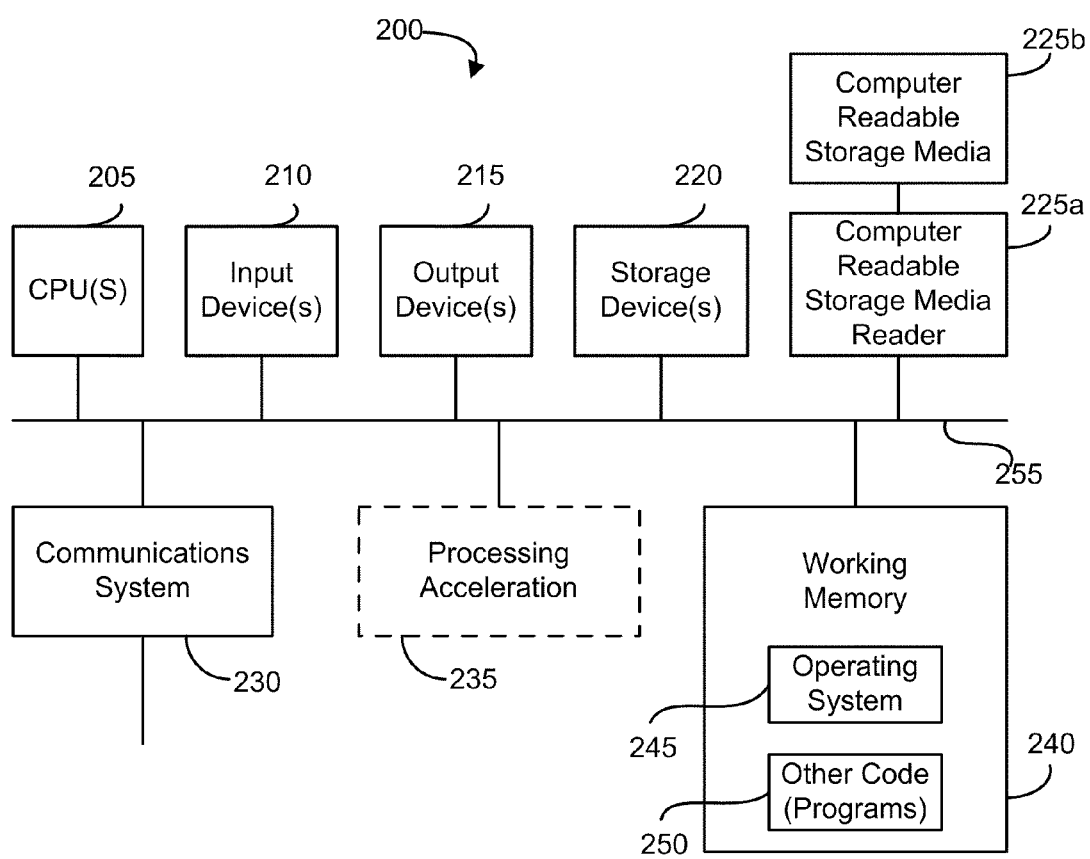
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
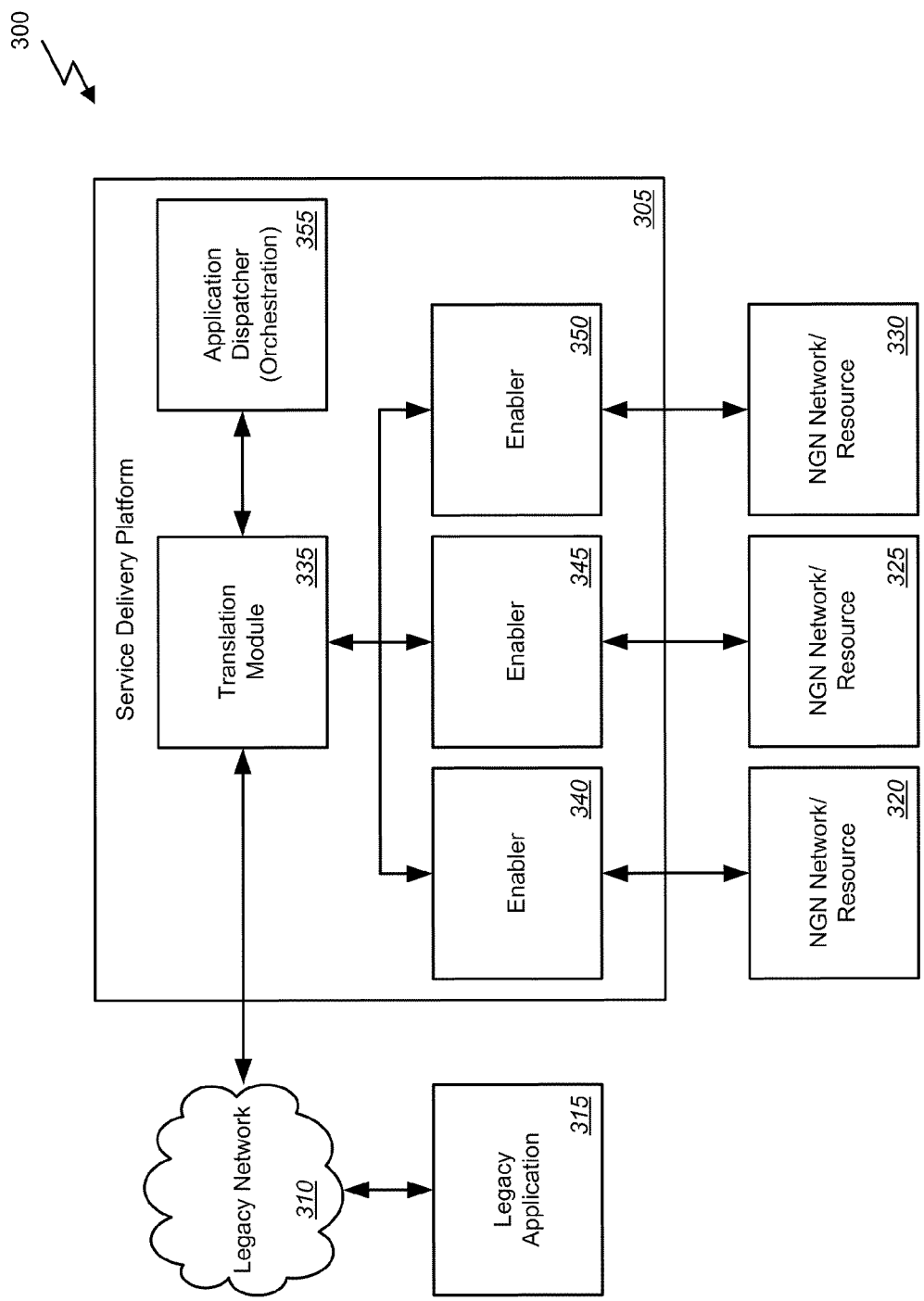
FIG. 3 is a block diagram illustrating, at a high-level, functional components of a system for coordinating interactions between different types of networks according to one embodiment of the present invention.

FIG. 3 is a block diagram illustrating, at a high-level, functional components of a system for coordinating interactions between different types of networks according to one embodiment of the present invention. In this example, the system 300 includes a legacy network 310 such as a Public Switch Telephone Network (PSTN) or various other one or more fixed and mobile communication networks. A legacy application or service 315 can be communicatively coupled with the legacy network 310 and can be adapted to provide services and/or interact with one or more clients (not shown here) of the legacy network as known in the art. It should be noted that, in other implementations, embodiments of the present invention can be implemented among two or more legacy networks (i.e., without a next generation network) or between two or more next generation networks (i.e., no legacy network).

The system can also include any number of Next Generation Network (NGN) networks or resources 320-330. For example, such networks or resources can include but are not limited to various the legacy application 315 to interact with the NGNs 320-330. Generally speaking, a service level component can be used to provide mapping and translation between the protocol of the legacy network 310 and legacy application 315 and the NGNs 320-330. For example, the system 300 can include a Service Delivery Platform (SDP) 305 through which the legacy application 315 interacts with the NGNs 320-330. According to one embodiment, the SDP 305 can abstract the underlying networks and/or resources so as to allow applications and/or services to access the network, resources, services, etc. in a way independent of the underlying network(s) and or resource(s) and the technologies upon which they may be implemented. Such a SDP can be implemented, for example, as described in U.S. patent application Ser. No. 11/357,653, filed Feb. 16, 2006, by Maes and entitled "Factorization of Concerns to Build a SDP (Service Delivery Platform)" and U.S. Pat. No. 8,898,326 issued Nov. 25, 2014, to Maes and entitled "Service Delivery Platform Based Support of Interactions Between Next Generation Networks and Legacy Networks" of which the entire disclosure of each is incorporated herein by reference for all purposes. However, in some implementations, the functions can be provided in a middleware execution environment e.g. with the enabler like call control implemented therein. An example would be in a SIP application server like JSR 289 SIP servlets container.

However, if implemented in an SDP, the SDP 305 can include one or more enablers 340-350 communicatively coupled with the NGNs 320-330. As used herein, the term enabler refers to a reusable service layer component or components that provide an intrinsic function for use by others (other enablers, applications (i.e. services) or any authorized resource) through appropriate northbound interfaces. Intrinsic means that an enabler does not itself provide functions provided by other enablers nor functions based on service provider policies (e.g. messaging does not include authentication, charging, logging, etc.). These functions may be implemented by network resources, devices or OSS/BSS functions. An enabler accesses these resources and/or functions via any mechanism appropriate for the resource. That is, a southbound interface is not specified as part of the adapter, so it can be changed from resource to resource. However, northbound interfaces provided by an enabler may be standardized. The enablers 340-350 can include any one or more of the enablers described, for example, in U.S. patent application Ser. No. 12/544,484 filed Aug. 20, 2009 by Maes and entitled "Charging Enabler", U.S. patent application Ser. No. 11/949,930 filed Dec. 4, 2007 by Maes and entitled "Call Control Enabler Abstracted from Underlying Network Technologies", a media server control enabler as described in U.S. patent application Ser. No. 11/877,129 filed Oct. 23, 2007 by Maes and entitled "Network Agnostic Media Server Control Enabler", an intelligent messaging enabler as described in U.S. patent application Ser. No. 11/939,705 filed Nov. 14, 2007 by Maes and entitled "Intelligent Message Processing" of which the entire disclosure of each is incorporated herein by reference for all purposes. Other types of enablers are contemplated and considered to be within the scope of the present invention.

Thus, the enablers 340-350 provide southbound interfaces specific to the underlying network technologies, i.e., of the NGNs 320-330, that allow access to the different networks. The enablers 340-350 also provide northbound interfaces that provide a way to compose, impose policies on, build application access, etc. the underlying networks and communications thereon. According to one embodiment, the SDP 305 can also include a translation module 335 communicatively coupled with the enablers 340-350, i.e., the northbound interfaces of the enablers 340-350, and the legacy network 310. The translation module can be adapted to translate between the northbound interfaces of the enablers 340-350 and the protocol of the legacy network 310. For example, the protocol of the legacy network 310 can be converted to Session Initiation Protocol (SIP) by the translation module 335. In this way, the SDP 305 or other service layer component can be adapted to translate between the protocol(s) of the legacy network 310 and the NGNs 320-330, for example via translation module 335, to allow the legacy application 315 to interaction with the NGNs 320-330 or resources or other components thereof as well as applications or services of the SDP 305 regardless of the underlying network technologies.

According to one embodiment, the SDP 305 can also include an application dispatcher 355 adapted to perform orchestration of communication sessions and/or components or services participating therein. Such an application dispatcher 355 can be implemented, for example, according to the methods and systems described in U.S. patent application Ser. No. 11/969,343 filed Jan. 4, 2008 by Maes and entitled "Abstract Application Dispatcher" the entire disclosure of which is incorporated herein by reference for all purposes. As noted therein, the application dispatcher 355 can be adapted to determine one or more components for providing at least one service in the communication session and direct the communication session to the one or more components. According to one embodiment, determining the one or more components and directing the communication session to the one or more components can be performed independent of supporting network technologies. For example, an enabler 340 can be communicatively coupled with the communication network, e.g., 320, and the application dispatcher 355 and can be adapted to provide a notification of a communication event on the communication network. The communication event can comprise a request from an application, a network event from an endpoint, or another event.

Identifying one or more components for providing at least one service can be based on the communication event, identity of a party to the communication event, services to which the party to the communication event is a subscriber, and/or other criteria. Directing the communication session to the one or more components can comprise invoking one or more functions via an interface of an enabler 340-350. In some cases, the services can comprise a plurality of services and directing the communication session to one or more components can comprises directing the communication session to the one or more components in sequence or in parallel.

Stated another way, coordinating interactions between different types of networks can comprise receiving at a service layer component such as SDP 305 a communication in a communication session from a first communication network. The communication can be in a first protocol, i.e., the legacy network or the next generation network depending on the source or originator of the communication. The communication can be translated from the first protocol to a second protocol with the service layer component based on a state of the communication session. According to one embodiment, the SDP 305 can include an application dispatcher 355. The application dispatcher 355 can identify one or more additional service layer components, e.g., enablers 340-350, for providing at least one service in the communication session and can dispatch the translated communication to the one or more additional service layer components.

As noted above, the SDP 305 described herein can be implemented according to the methods and systems described in the referenced applications entitled "Factorization of Concerns to Build a SDP (Service Delivery Platform)" and "Service Delivery Platform Based Support of Interactions Between Next Generation Networks and Legacy Networks." As noted therein, such an SDP can be implemented, e.g., via a set of one or more enablers, to abstract the underlying protocols and technologies of the networks on which a communication session is occurring. Furthermore, the SDP 305 can translate the various protocols, for example to SIP or another protocol, and handle or process the communications based on the translated messages. This processing can include orchestrating or coordinating the session or components participating in the session. A portion of the application entitled "Service Delivery Platform Based Support of Interactions Between Next Generation Networks and Legacy Networks" is reproduced here for the sake of convenience.

Figure 4:
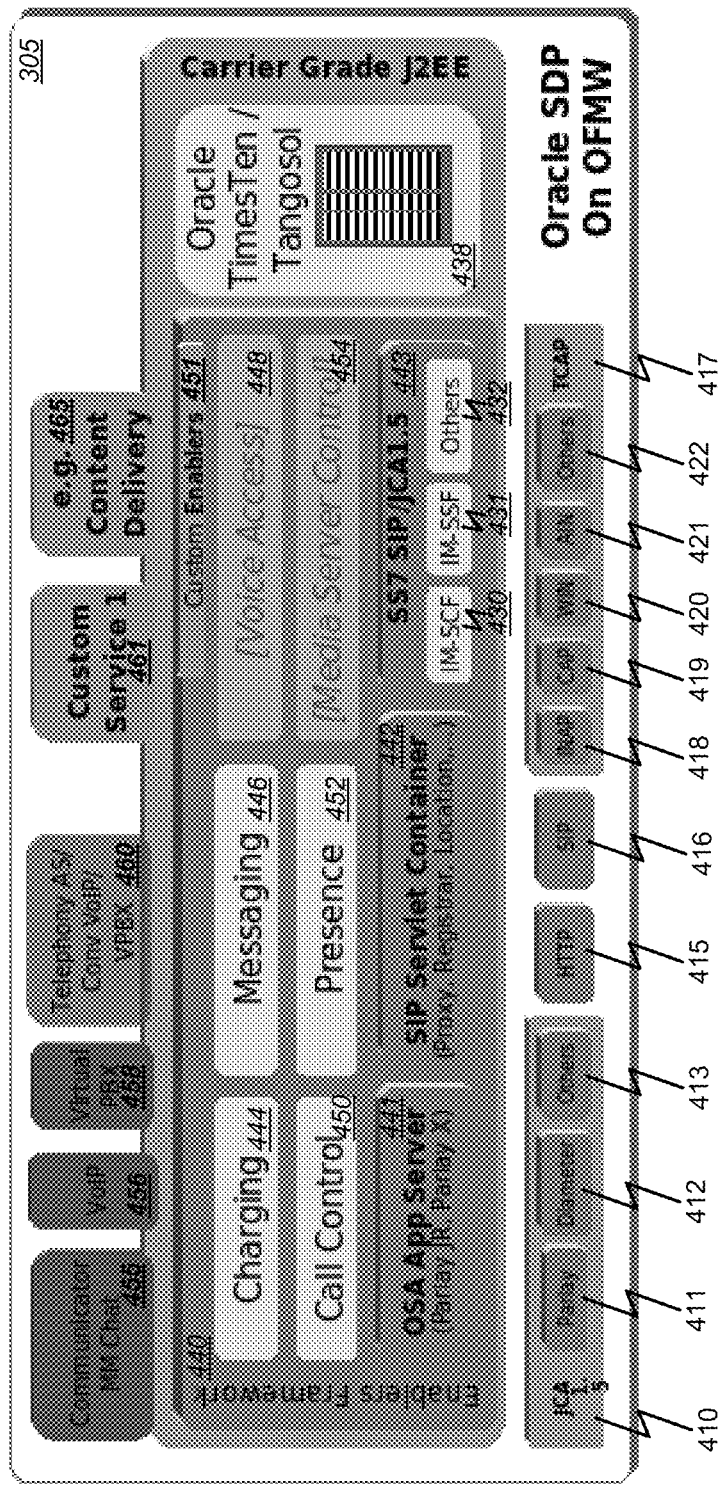
FIG. 4 is a block diagram illustrating additional details of a system for coordinating interactions between different types of networks according to one embodiment of the present invention.

FIG. 4 is a block diagram illustrating additional details of a system for coordinating interactions between different types of networks according to one embodiment of the present invention. More specifically, this example illustrates an SDP 305 which, as noted above, can be adapted to support interactions in a communication session as described herein. In this example, the SDP 305 includes a number of adapters 410-422 for providing an interface between the SDP 305 and any number of networks and/or resources of various types. For example, these adapters 410-422 can include but are not limited to one or more JCA 1.5 adapters 410 such as a Parlay adapter 411, a Diameter adapter 412, and others 413, an HTTP adapter 415, a SIP adapter 416, and one or more Transaction Capabilities Application Part (TCAP) adapters 417 such as adapters for INAP 418, CAP 419, WIN 420, AIN 421, and others 422.

The SDP 305 can also include an enabler framework 440. The enabler framework 340 can include an OSA application server 441 implemented, for example, in Parlay JR, Parlay X etc. The enabler framework 340 may additionally or alternatively include a SIP servlet container 442 providing functions such as a proxy, registrar, location services, etc. The enabler framework 340 may additionally or alternatively include a Signaling System 7 (SS7) server 443 adapted to implement or provide IP Multimedia Service Control Functions (IM-SCF) 430, IP Multimedia Service Switching Functions (IM-SSF) 431, and other functions.

Enablers of the enabler framework 440 can include but are not limited to: Messaging 446, e.g., application to person and person to application multi-channel messaging able to support email, SMS, MMS, IM, Voice Messages and SIP; Presence 452, e.g., Presence, XDM and RLS enabler functions that can be aggregated across multiple presence-enabled networks and sources; Call control 450, e.g., generic, 3rd party and multi party call control (voice and media) realizable on many network technologies application routing/dispatching independently of the network technology; Media server control 454, e.g., media processing, mixing and streaming control realizable against many network and media server technologies; Voice Access 448, e.g., inclusion of voice and DTMF dialogs in a call/interaction with a user; Web and mobile access (not shown here), e.g., multi-channel portal including associated supporting technologies such as device recognition, device repository, adaptation and delivery to multiple channels; Charging 444, e.g., service level on-line and offline charging including Balance check/tracking, pre-rated charges, delegated rating and rate inquiries; Device Management (not shown here), e.g., device and network resource provisioning, policy execution, enforcement and management providing functions such as PDP (Policy Decision Point), PEP (Policy Enforcement Point), PEEM (callable and proxy mode), PE.; and others. One or more custom enablers 451 can also be included or added. Providing additional/new enablers or extending them can be accomplished by developing new J2EE components with northbound interfaces, following the enabler principles and reusing the enabler framework functions or by developing new adapters using standard technologies and recipes (e.g. JCA 1.5, SIP, HTTP, etc.) to integrate existing enabler with new resources, protocols or network technologies.

The SDP 305 can include applications for providing or supporting VoIP services 456, a virtual PBX 458, a telephony application server 460, etc. The SDP 305 can also include applications for supporting or providing chat services 455, one or more custom services 460, content delivery 465, identity management 438, etc. As noted above, these applications can also include or be adapted to perform the functions of an application dispatcher as described in the referenced application entitled "Abstract Application Dispatcher." That is, the applications of the SDP can include a dispatcher that can be adapted to determine one or more components for providing at least one service in the communication session and direct the communication session to the one or more components, e.g., components of the enabler framework 340. Therefore, determining the one or more components and directing the communication session to the one or more components can be performed independent of supporting network technologies.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for coordinating interactions between different types of networks, the method comprising:
    receiving by an enabler executing on a Service Delivery Platform (SDP) a communication in a communication session from a first communication network, wherein the communication is in a first protocol, wherein the enabler comprises a service layer component of the SDP, and wherein the enabler provides a southbound interface specific to the first communication network and a northbound interface that abstracts the first communication network;
    receiving by a translation module executing on the SDP the communication in the communication session from the northbound interface of the enabler, wherein the translation module comprises a service level component of the SDP;
    translating, by the translation module of the SDP, the communication from the northbound interface of the enabler to a second protocol based on a state of the communication session, wherein the first protocol is different from the second protocol and wherein the second protocol comprises Session Initiation Protocol (SIP);
    identifying by an application dispatcher executing at the service layer of the SDP one or more additional service layer components for providing at least one service in the communication session based on the communication translated to the second protocol and service layer components available to communicate in the second protocol; and
    dispatching the translated communication to the one or more additional service layer components from the application dispatcher, wherein dispatching the translated communication to the one or more additional service layer components comprises providing the translated communication to a northbound interface of an enabler of the SDP.

2. The method of claim 1, wherein the first communication network comprises a legacy network and the second communication network comprises a next generation network.

3. The method of claim 2, further comprising providing the translated communication to a component of the next generation network.

4. The method of claim 1, wherein providing the translated communication to the one or more additional service layer components further comprises providing the translated communication to a SIP servlet of the SDP.

5. The method of claim 1, wherein the one or more additional service layer components comprise one or more enablers.

6. The method of claim 1, wherein the one or more enablers comprise one or more of a call control enabler, a media server control enabler, a messaging enabler, a charging enabler, a voice access enabler, and a presence enabler.

7. The method of claim 1, wherein the first communication network comprises a next generation network and the second communication network comprises a legacy network.

8. The method of claim 1, further comprising providing the second communication to a component of the legacy network.

9. The method of claim 8, wherein providing the second communication to the component of the legacy network comprises providing the second communication to a northbound interface of an enabler of the SDP.

10. The method of claim 9, wherein the one or more additional service layer components comprise one or more enablers.

11. The method of claim 9, wherein the one or more enablers comprise one or more of a call control enabler, a media server control enabler, a messaging enabler, a charging enabler, a voice access enabler, and a presence enabler.

12. The method of claim 9, wherein providing the second communication to the component of the legacy further comprises providing the second communication to a Internet Protocol (IP) Multimedia Service Switching Function (IM-SSF) of the SDP.

13. A machine-readable memory device comprising a set of instruction stored thereon which, when executed by a processor, cause the processor to coordinate interactions between different types of networks by:
    receiving by an enabler executing on a Service Delivery Platform (SDP) a communication in a communication session from a first communication network, wherein the communication is in a first protocol, wherein the enabler comprises a service layer component of the SDP, and wherein the enabler provides a southbound interface specific to the first communication network and a northbound interface that abstracts the first communication network;
    receiving by a translation module executing on the SDP the communication in the communication session from the northbound interface of the enabler, wherein the translation module comprises a service level component of the SDP;
    translating, by the translation module of the SDP, the communication from the northbound interface of the enabler to a second protocol based on a state of the communication session, wherein the first protocol is different from the second protocol and wherein the second protocol comprises Session Initiation Protocol (SIP);
    identifying by an application dispatcher executing at the service layer of the SDP one or more additional service layer components for providing at least one service in the communication session based on the communication translated to the second protocol and service layer components available to communicate in the second protocol; and
    dispatching the translated communication to the one or more additional service layer components from the application dispatcher, wherein dispatching the translated communication to the one or more additional service layer components comprises providing the translated communication to a northbound interface of an enabler of the SDP.

14. A system comprising:
    a processor; and
    a memory coupled with and readable by the processor and storing therein a set of instructions which, when executed by the processor, causes the processor to coordinate interactions between different types of networks by:

receiving by an enabler executing on a Service Delivery Platform (SDP) a communication in a communication session from a first communication network, wherein the communication is in a first protocol, wherein the enabler comprises a service layer component of the SDP, and wherein the enabler provides a southbound interface specific to the first communication network and a northbound interface that abstracts the first communication network;

receiving by a translation module executing on the SDP the communication in the communication session from the northbound interface of the enabler, wherein the translation module comprises a service level component of the SDP;

translating, by the translation module of the SDP, the communication from the northbound interface of the enabler to a second protocol based on a state of the communication session, wherein the first protocol is different from the second protocol and wherein the second protocol comprises Session Initiation Protocol (SIP);

identifying by an application dispatcher executing at the service layer of the SDP one or more additional service layer components for providing at least one service in the communication session based on the communication translated to the second protocol and service layer components available to communicate in the second protocol; and dispatching the translated communication to the one or more additional service layer components from the application dispatcher, wherein dispatching the translated communication to the one or more additional service layer components comprises providing the translated communication to a northbound interface of an enabler of the SDP.

15. The system of claim 14, wherein the first communication network comprises a legacy network and the second communication network comprises a next generation network.

16. The system of claim 14, further comprising providing the translated communication to a component of the next generation network.

17. The system of claim 14, wherein providing the translated communication to the one or more additional service layer components further comprises providing the translated communication to a SIP servlet of the SDP.

18. The system of claim 14, wherein the one or more additional service layer components comprise one or more enablers.

19. The system of claim 14, wherein the one or more enablers comprise one or more of a call control enabler, a media server control enabler, a messaging enabler, a charging enabler, a voice access enabler, and a presence enabler.

* * * * *

UNITED STATES PATENT AND TRADEMARK OFFICE
CERTIFICATE OF CORRECTION

PATENT NO. : 8,990,413 B2
APPLICATION NO. : 13/021982
DATED : March 24, 2015
INVENTOR(S) : Maes It is certified that error appears in the above-identified patent and that said Letters Patent is hereby corrected as shown below:

In the specification

In column 7, line 46, delete "and or" and insert -- and/or --, therefor.

Signed and Sealed this
Third Day of November, 2015

Michelle K. Lee
*Director of the United States Patent and Trademark Office*